(12) United States Patent
Booz et al.

(10) Patent No.: US 10,346,406 B2
(45) Date of Patent: Jul. 9, 2019

(54) DECENTRALIZED AUTONOMOUS EDGE COMPUTE COORDINATED BY SMART CONTRACT ON A BLOCKCHAIN

(71) Applicant: International Business Machines Corporation, Armonk, NY (US)

(72) Inventors: David A. Booz, Poughkeepsie, NY (US); Jonathan D. Dye, Armonk, NY (US); Michael J. Dye, Salt Lake City, UT (US); Egan F. Ford, Salt Lake City, UT (US)

(73) Assignee: International Business Machines Corporation, Armonk, NY (US)

( * ) Notice: Subject to any disclaimer, the term of this patent is extended or adjusted under 35 U.S.C. 154(b) by 622 days.

(21) Appl. No.: 15/082,559

(22) Filed: Mar. 28, 2016

(65) Prior Publication Data
US 2017/0279774 A1 Sep. 28, 2017

(51) Int. Cl.
| | |
|---|---|
| *G06F 16/2455* | (2019.01) |
| *H04L 29/08* | (2006.01) |
| *H04L 29/06* | (2006.01) |
| *G06Q 20/06* | (2012.01) |
| *G06Q 20/08* | (2012.01) |
| *G06Q 20/12* | (2012.01) |
| *G06Q 20/14* | (2012.01) |
| *G06Q 20/22* | (2012.01) |

(52) U.S. Cl.
CPC ... *G06F 16/24568* (2019.01); *G06Q 20/0655* (2013.01); *G06Q 20/0658* (2013.01); *G06Q 20/0855* (2013.01); *G06Q 20/123* (2013.01); *G06Q 20/145* (2013.01); *G06Q 20/223* (2013.01); *H04L 63/10* (2013.01); *H04L 65/4069* (2013.01); *H04L 67/2823* (2013.01); *H04L 67/34* (2013.01)

(58) Field of Classification Search
None
See application file for complete search history.

(56) References Cited

U.S. PATENT DOCUMENTS

| | | | | |
|---|---|---|---|---|
| 6,262,928 B1 * | 7/2001 | Kim | ....................... | G11C 29/02 |
| | | | | 365/189.04 |
| 6,635,014 B2 * | 10/2003 | Starkweather | ..... | A61N 1/37211 |
| | | | | 600/300 |

(Continued)

OTHER PUBLICATIONS

Hossain et al (FIF-IoT: A Forensic Investigation Framework for IoT Using a Public Digital Ledger) (Year: 2018).*

(Continued)

*Primary Examiner* — Mamon Obeid
(74) *Attorney, Agent, or Firm* — Scully, Scott, Murphy & Presser, P.C.; Joseph Petrokaitis, Esq.

(57) ABSTRACT

The systems, apparatus, methods, and computer program products described herein provide the capability for an entity to identify and autonomously contract via a blockchain database with an unknown and anonymous host device for access rights to a high volume raw data stream generated by a sensor of the host device. The systems, apparatus, methods, and computer program products further provide the capability for the entity to push or upload a software module to the host device to allow the entity to process the high volume raw data stream into a low volume data stream directly on the host device, i.e., at the source of the high volume raw data stream.

20 Claims, 12 Drawing Sheets

(56) References Cited

U.S. PATENT DOCUMENTS

| | | | | |
|---|---|---|---|---|
| 7,286,894 B1* | 10/2007 | Grant | ............... | G06F 15/02 |
| | | | | 700/168 |
| 7,860,760 B2* | 12/2010 | Smith | ............... | G06Q 30/0621 |
| | | | | 705/26.5 |
| 8,620,916 B2* | 12/2013 | Lin | ............... | G06Q 99/00 |
| | | | | 707/736 |
| 8,635,644 B1* | 1/2014 | Harvey | ............... | G01R 1/071 |
| | | | | 725/38 |
| 8,862,506 B2* | 10/2014 | Smith | ............... | G06Q 10/00 |
| | | | | 705/26.1 |
| 9,153,123 B2* | 10/2015 | Glenn | ............... | H04W 4/70 |
| 10,129,791 B2* | 11/2018 | Agrawal | ............... | H04W 28/12 |
| 2004/0098716 A1* | 5/2004 | Cheng-Chung | ............... | G06F 8/20 |
| | | | | 717/178 |
| 2004/0236189 A1* | 11/2004 | Hawthorne | ............... | G06F 19/3418 |
| | | | | 600/300 |
| 2008/0016436 A1* | 1/2008 | Liu | ............... | H04L 67/34 |
| | | | | 715/212 |
| 2008/0082930 A1* | 4/2008 | Omernick | ............... | G06F 1/1626 |
| | | | | 715/765 |
| 2012/0192118 A1* | 7/2012 | Migos | ............... | G06F 1/1626 |
| | | | | 715/863 |
| 2014/0032267 A1* | 1/2014 | Smith | ............... | G06Q 10/00 |
| | | | | 705/7.29 |
| 2014/0372097 A1* | 12/2014 | Karvonen | ............... | A61B 5/0024 |
| | | | | 703/13 |
| 2015/0197064 A1* | 7/2015 | Walker | ............... | G06F 17/50 |
| | | | | 700/98 |
| 2015/0379510 A1* | 12/2015 | Smith | ............... | G06Q 20/3829 |
| | | | | 705/71 |
| 2016/0306689 A1* | 10/2016 | Jain | ............... | G06F 11/0742 |
| 2017/0134937 A1* | 5/2017 | Miller | ............... | G06Q 20/3829 |
| 2017/0188168 A1* | 6/2017 | Lyren | ............... | H04S 1/007 |
| 2017/0212742 A1* | 7/2017 | Lee | ............... | G06F 8/61 |
| 2017/0232300 A1* | 8/2017 | Tran | ............... | H04L 67/12 |
| | | | | 434/247 |
| 2017/0279774 A1* | 9/2017 | Booz | ............... | G06F 16/24568 |
| 2018/0018430 A1* | 1/2018 | Brown | ............... | A61B 5/14532 |
| 2018/0032064 A1* | 2/2018 | Fang | ............... | A61B 6/02 |
| 2018/0039785 A1* | 2/2018 | Naqvi | ............... | G06Q 30/0635 |
| 2018/0039786 A1* | 2/2018 | Naqvi | ............... | G06Q 20/027 |
| 2018/0150647 A1* | 5/2018 | Naqvi | ............... | H04L 9/321 |
| 2018/0255092 A1* | 9/2018 | Thubert | ............... | H04L 63/1458 |
| 2018/0315145 A1* | 11/2018 | Darnell | ............... | G06Q 50/205 |
| 2018/0342171 A1* | 11/2018 | Darnell | ............... | H04L 9/0637 |
| 2019/0014204 A1* | 1/2019 | Youn | ............... | G01S 19/14 |

OTHER PUBLICATIONS

Giulio, P., "Network of Smart Sensors Operating on the Blockchain", Bitcoin Magazine, https://bitcoinmagazine.com/articles/filament-develops-ad-hoc-mesh-networks-smart-sensors-operating-blockchain-1435352121, Jun. 26, 2015, Printed Mar. 23, 2016.

Filament, "A Declaration of Device Independence", https://medium.com/@FilamentHQ/a-declaration-of-device-independence-b6f83e8b6441#.mg3i9wryw, Jun. 23, 2015, Printed Mar. 23, 2016.

O'Connor, M., "Three Approached to IoT Security: Part Two", http://www.iotjournal.com/articles/view?13351, Aug. 5, 2015, printed Mar. 23, 2016.

Higginbotham, S., "This Startup raised $5 million to bring the blockchain to the Internet of things", http://fortune.com/2015/08/18filament-blockchain-iot/, Aug. 18, 2015, printed Mar. 23, 2016.

Smith Knowledgelevers, S., "Empowering Individuals to Monetize Personal and IOT Data Using Smart Contracts and the Block Chain", https://www.linkedin.com/pulse/empowering-individuals-monetize-personal-iot-data-knowledgelevers, Sep. 30, 2015, printed Mar. 23, 2016.

Nakamoto, S., "A Peer-to-Peer Electronic Cash System", Bitcoin Magazine, www.bitcoin.org, printed Mar. 23, 2016.

IBM Device Democracy Slide Show, "Saving the Future of the Internet of Things", http://www-01.ibm.com/common/ssi/cgi-bin/ssialias?infotype=PM&subtype=XB&htmlfid=GBE03620USEN, Jul. 2015, printed Mar. 23, 2016.

* cited by examiner

DEVICE SELF-REGISTRATION

WELCOME

New Users: Your device is accessible via a default account name and password. It is recommended that you change the password immediately, to improve security of your device and local network.

To change your Pi's default password, log in to your Pi via the console (if using an external monitor) or ssh from another computer. for example (ssh w/ linux):

ssh pi@192.168.123.3 (use your device's IP)
Login: pi, password: raspberry
passwd (set new password as prompted)

Additional security advice: Take care to never expose device management pages outside of your LAN. Use proper LAN security measures (strong router passwords, firewall).

To Register:
Fill in the fields below to register your device on the system.

CONTRACT BASE PRICE (BACON)

902 — | 2 |

PER-CONTRACT MONTHLY BANDWIDTH
THROTTLING THRESHOLD (MB)

904 — | 1020 |

DEVICE LOCATION

| 40.6974 |

FIG. 9

DEVICE LOCATION

906 — 40.6974

-111.9961

Coordinates are in decimal degrees: "South" latitudes and "West" longitudes are expressed as negative values. We've pre-filled the fields with discovered values. If you'd like to correct inaccurate discovered values, you might browse to LatLong.net to find yourself on a world map.

PROJECT INVOLVEMENT

908 — ☐ Are you willing to seed software modules to other users?

910 — ☑ Will you permit entity devices to update software modules without renegotiating contracts?

SUBMIT

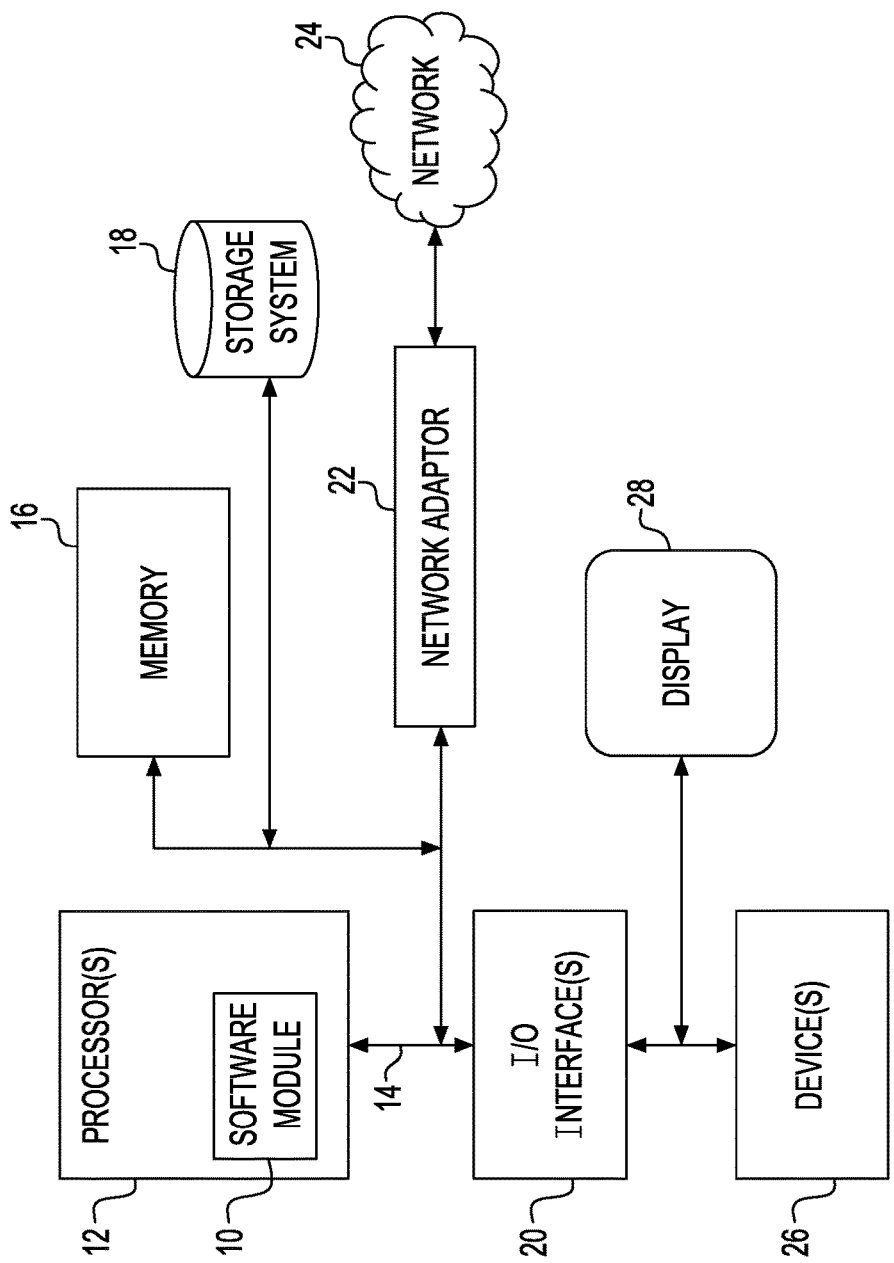

DECENTRALIZED AUTONOMOUS EDGE COMPUTE COORDINATED BY SMART CONTRACT ON A BLOCKCHAIN

TECHNICAL FIELD

The present disclosure relates to systems, methods, and computer program products that provide an entity with the ability to upload a software module to a host device to process a data stream generated by a sensor device operating at the host device according to terms of a smart contract on a blockchain.

BACKGROUND

Blockchain technology was developed as a way to provide a publicly transparent and decentralized ledger that tracks and store digital currency transactions in a publicly verifiable secure and hardened manner to prevent tampering or revision. Blockchain technology has since been expanded to provide a decentralized public ledger for tracking transactions involving smart self-executing contracts in a publicly transparent publicly verifiable manner.

BRIEF SUMMARY

The systems, apparatus, methods, and computer program products described herein provide the capability for an entity to identify and autonomously contract via a blockchain database with an unknown and anonymous host device for access rights to a high volume raw data stream generated by a sensor of the host device. The systems, apparatus, methods, and computer program products further provide the capability for the entity to automatically push or upload a software module to the host device to allow the entity to process the high volume raw data stream into a low volume data stream directly on the host device, i.e., at the source of the high volume raw data stream. This allows the entity to reduce high volumes of largely irrelevant data into more manageable lower volumes of largely relevant data prior to transmission of the data back to the entity, thereby reducing the amount of data that needs to be transmitted over the network to the entity and stored for later processing.

In an aspect of the present disclosure, a method is disclosed. The method includes joining, by a host device, a blockchain managed by one or more devices on a decentralized network. The blockchain may include one or more smart contracts that specify transactions among entities. The host device may include a sensor configured to generate a real-time high volume data stream. The method may further include creating on the blockchain, by the host device, a smart contract specifying terms for providing an entity access to the real-time high volume data stream generated by the sensor. The method may further include receiving, by the host device, from an entity device, a software module in response the created smart contract. The software module may be configured to process the real-time high volume data stream generated by the sensor into a real-time low volume data stream for transmission to the entity device. In response to receiving the software module, the method may further include executing, by the host device, the software module. Execution of the software module may process the real-time high volume data stream generated by the sensor into a real-time low volume data stream. The method may further include transmitting, to the entity device, by the host device, the real-time low volume data stream generated by the software module.

In an aspect of the present disclosure a method is disclosed including querying, by an entity device, a blockchain managed by one or more devices on a decentralized network to identify a host device including a sensor configured to generate a real-time high volume data stream and receiving in response to the query, by the entity device, a link to a smart contract associated with the host device. The smart contract may be stored on the blockchain and may specify terms for providing an entity access to the real-time high volume data stream generated by the sensor. The method may further include submitting, by the entity device, to the host device, a proposal to access the real-time high volume data stream generated by the sensor according to the terms of the smart contract. The proposal may specify a software module to be uploaded to and executed on at least a portion of the host device. The software module may be configured to process the real-time high volume data stream generated by the sensor into a real-time low volume data stream for transmission to the entity device. The method may further include receiving, by the entity device, an acceptance of the proposal and in response to receiving an acceptance of the proposal, transmitting, by the entity device, to the host device the software module. The method may further include receiving, by the entity device, the real-time low volume data stream generated by the software module from the host device.

In aspects of the present disclosure apparatus, systems, and computer program products in accordance with each of the above aspects may also be provided.

BRIEF DESCRIPTION OF THE DRAWINGS

The details of the present disclosure, both as to its structure and operation, can best be understood by referring to the accompanying drawings, in which like reference numbers and designations refer to like elements.

FIGS. 9-10 are illustrations of a graphical user interface for allowing a host device to create a smart contract on the blockchain database of FIG. 1.

FIG. 12 is an exemplary block diagram of a computer system in which processes involved in the system, method, and computer program product described herein may be implemented.

DETAILED DESCRIPTION

The system, method, and computer program product described herein may provide an entity with access to data generated by a sensor of a host device through the use of smart contracts executing on a blockchain database. The accessed data may be processed directly on the host device in real time using software provided by the entity.

Figure 1:
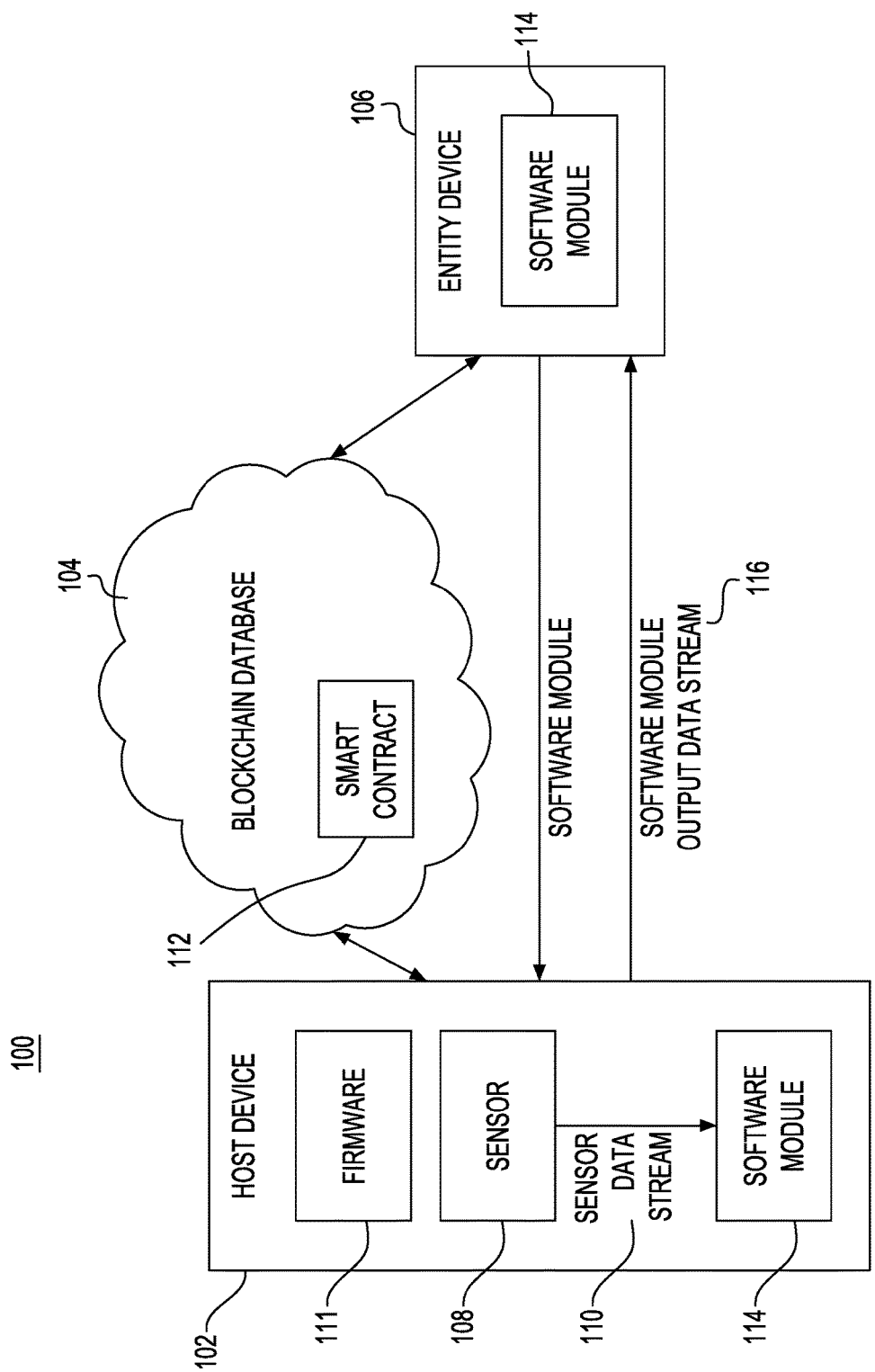
FIG. 1 is an exemplary diagram of a system in which the system, method, and computer program product described herein may be implemented, along with the entities involved in blockchain system interactions.

The system, method, and computer program product described herein may be applied to both centralized and decentralized ledger systems (blockchain database). An example of a system 100 in which the system, method, and computer program product described herein may implemented, along with the entities involved in blockchain interactions, is shown in FIG. 1. The system of FIG. 1 includes, but is not limited to, host device 102, blockchain database 104, and an entity device 106.

Host device 102 may be a computer system including a sensor 108 that is configured to generate a real-time data stream 110. For example, sensor 108 may be a radar receiver, temperature sensor, barometer, light sensor, motion detectors, video feeds, software data sensors, web crawlers, or any other type of sensor that is configured to generate and provide a real-time data stream to host device 102. The real-time data stream 110 may include, for example, primitive, unprocessed, last mile, unanalyzed, live, raw, source data. In some embodiments, real-time data stream 110 is not held for long term storage and historical data based on real-time data stream 110 is not stored for later use. For example, in some embodiments, real-time data stream 110 may only be accessed and processed in real time as it is streamed. For example, host device 102 may not include sufficient storage capacity to store real-time data stream 110 for later use.

Host device 102 may include firmware 111 that is configured specifically for communications with blockchain database 104 and entity devices 106. Firmware 111 governs local resources on host device 102, blockchain interactions with blockchain database 104, and other aspects of host device 102's interaction with the system and entity devices 106. Host device 102 may receive updated versions of firmware 111 through blockchain database 104 or may in some embodiments receive updated versions of firmware 111 through decentralized peer-to-peer technologies. Firmware 111 may then be installed directly by host device 102.

Blockchain database 104 is a public ledger configured to maintain a continuously growing list of data records. A blockchain is formed from blocks of data records that are connected together through the use of hashing. For example, every time a new block is added to the blockchain, the new block includes a hash of a prior block. In this manner, each additional block creates additional security for the validity of the entire blockchain. Each block records and confirms the sequence and timing of transactions, e.g., smart contracts, as they are created and/or executed.

Figure 2:
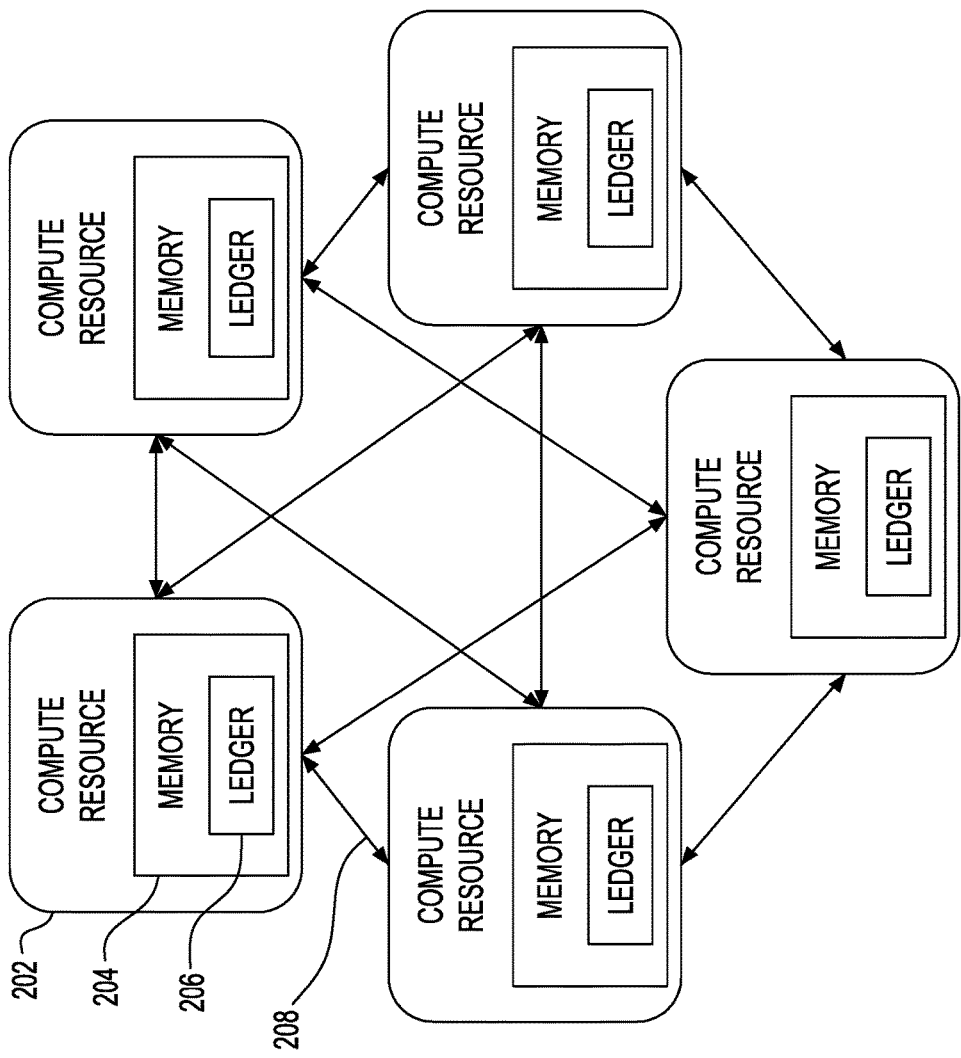
FIG. 2 is an exemplary diagram of a decentralized network containing a blockchain database, host devices and entity devices (compute resources)

Blockchain database 104 may be a decentralized database including one or more compute resources 202, as shown, for example, in FIG. 2. In some embodiments, there may be no central authority controlling blockchain database 104. In some embodiments, the data stored on blockchain database, i.e., the public ledger, may not be stored at a central location in its entirety.

Compute resources 202 may include any device, computer, system or otherwise that has joined blockchain database 104 and forms a node in the blockchain database 104. Compute resources 202 may include but are not limited to, for example, personal computers, servers, cell phones, tablets, laptops, smart tv's, or any other device capable of storing information and communicating over a network. In some embodiments, compute resources 202 may be unaffiliated with or unknown to each other where, for example, compute resources 202 remain anonymous. Each compute resource 202 may include a memory 204 that stores a copy of at least a portion of the public ledger 206 of blockchain database 104. Compute resources 202 may also execute one or more programs to perform various functions associated with maintaining blockchain database 104 including, for example, updating the public ledger 206, generating new blocks, or any other similar function.

Public ledger 206 may store any transactions performed over blockchain database 104 including but not limited to, for example, smart contracts created by host devices, transactions involving the created smart contracts, a directory (contract), device registry (contract), device contracts, device accounts, or any other transaction related to and occurring on blockchain database 104.

Because each compute resource 202 stores a copy of at least a portion of the public ledger 206 of blockchain database 104, public ledger 206 may be independently verified for accuracy at any time by comparing the stored copies of multiple compute resources 202. Communication between compute resources 202 may occur via a communications network 208. Communications network 208 may include any wired or wireless connection, the internet, or any other form of communication. In some embodiments, each compute resource 202 may communicate directly with each other compute resource 202 via communications network 208. In some embodiments, a first compute resource 202 may not be able to communication directly with a second compute resource 202, for example, where both first and second compute resources 202 are not connected to the same communications network 208. In this case, communications related to blockchain database 104 between the first and second compute resources 202 may occur by using one or more of the remaining compute resources 202 as an intermediary. In some embodiments, one or more of compute resources 202 may not maintain a connection to blockchain database 104 at all times. For example, a compute resource 202 may only be connected to blockchain database 104 during a certain period of time each day or may only be connected to blockchain database 104 intermittently throughout the day. Due to the decentralized nature of blockchain database 202, such an intermittent connection by one or more compute resources 202 does not affect the overall operation of blockchain database 104 since copies of public ledger 206 are stored on multiple compute resources 202. Once the disconnected compute resource 202 reconnects to blockchain database 104, the disconnected compute resource 202 may receive updated copies of the public ledger 206 from one or more of the compute resources 202 that have been connected to blockchain database 104.

Referring again to FIG. 1, blockchain database 104 may be configured to store and execute one or more smart contracts 112 associated with one or more host devices 102. A smart contract 112 is a self-executing contract created by a host device 102 that is configured to provide a potential counterparty, for example, entity device 106, with specific terms that must be met before the entity device 106 can autonomously receive access rights to a data stream generated by a sensor 108 of host device 102. So long as the terms of the smart contract 112 are met by entity device 106, the smart contract 112 will automatically execute an agreement between entity device 106 and host device 102 and access to the data stream will automatically be provided by host device 102. By storing and executing smart contracts 112 on blockchain database 104 a permissionless model is provided that allows an entity device 106 to join the blockchain database 104 to access and make use of the real-time data stream 110 from host device 102 even when there is no relationship between host device 102 and entity device 106 and each device may be unknown and un-trusted to the other.

Entity device 106 represents an entity desiring to obtain access to data generated by sensor 108 of host device 102. Entity devices 106 may include computing devices or other systems associated with and/or operated by entities including but not limited to, for example, news networks, weather forecasters, scientific organizations, research establishments, governments, companies, individuals, or any other entity that may desire access to the data generated by sensor 108. In some embodiments, the entity using entity device 106 may have no prior affiliation with or knowledge of host device 102. In some embodiments a transaction between host device 102 and entity device 106 may remain anonymous.

Entity device 106 may utilize blockchain database 104 to find potential host devices 102 having sensors 108 configured to generate real-time streaming data of a particular type desired by entity device 106. Entity device 106 may include a software module 114 that is configured to process the real-time data stream 110 from sensor 108 to generate a real-time data stream having a lower volume and higher value for entity device 106. For example, software module 114 may process the raw source data stream 110 generated by sensor 108 having a high volume of mostly irrelevant low value information into a data stream having a low volume of mostly high value information that is relevant to entity device 106.

In some embodiments, software module 114 may be provided (e.g., communicated over a network) by entity device 106 to host device 102 for execution directly on host device 102. For example, software module 114 may be uploaded from entity device 106 to host device 102 directly, via a peer-to-peer messaging service, via a peer-to-peer file sharing service, via blockchain database 104, or in any other manner. Software module 114 may be provided to host device 102 by entity device automatically upon execution of smart contract 112. In some embodiments, software module 114 may be a computer program that is configured to obtain and process real-time data stream 110, to open a communication pathway with entity device 106, and to transmit the processed output data stream back to entity device 106 via the opened communication pathway.

By providing software module 114 directly to host device 102 for execution on host device 102, entity device 106 may process the real-time data stream 110 directly on host device 102 at the source of the data stream. In some embodiments, the output data stream 116 from software module 114 may then be transmitted back to entity device 106 in real-time, for example, directly, via peer-to-peer messaging service, via a peer-to-peer file sharing service, via blockchain database 104, or in any other manner. In other embodiments, the output data stream 116 may be temporarily stored for later transmission, for example, when host device 102 is unable to access a network connection for a period of time while still gathering data. By processing real-time data stream 110 directly on host device 102, entity device 106 can reduce the volume of communications between host device 102 and entity device 106 and thereby reduce network congestion associated with streaming high volumes of raw data from host device 102 to entity device 106 for later processing. For example, by processing real-time data stream 110, a high volume raw data stream of mostly irrelevant information, is converted into a low volume data stream 116 such that only that data which is relevant or desired by entity device 106 is transmitted back to entity device 106. When such a method and system is applied to a large number of host device/entity device communications, for example, communications with billions of host devices, the savings in network congestion by transmitting processed low-volume data instead of raw high-volume data can become extremely important. Although high volume and low volume are relative terms, in some embodiments it is contemplated that a low volume data may be a portion or percentage of high volume data. In a non-limiting example, if the raw real-time data stream 110 streams at a rate of 150 Mbit/s, 150 Mbit/s may be considered a high volume data stream. Likewise when the raw data is processed by software module 114, the output low-volume data stream 116 may be significantly smaller than the high volume data stream of 150 Mbit/s. For example, the output low-volume data stream 116 may stream at 30 Mbit/s (i.e. 20% of the high-volume raw data stream 110), or less. These example values are intended to be non-limiting where, for example, a high-volume or low-volume may be dependent on a number of different factors related to the system including but not limited to, for example, the storage capacity of the host device 102, the transmission capacity of the host device 102, the capacity of the network to transmit the data, the receiving capacity of the entity device 106, and the storage capacity of the entity device 106.

In some embodiments, host device 102 may not even be capable of outputting a high volume data stream. For example, host device 102 may include a network connection that is only capable of transmitting at a maximum of 60 Mbit/s which may cause a delay in the transmission of the entire stream of raw data. The present system allows an entity device 106 to receive the most relevant data as soon as possible by processing the data on host device 102 to a volume that host device 102 is capable of transmitting in real-time rather than waiting for the entirety of the raw data to trickle in for later processing.

It is important to note that the relative determination of value may be based on the needs or requirements of entity device 106 where different entity devices 106 may determine that the same information has a different value. For example, if two separate entity devices 106 execute or enter into a smart contract 112 with a host device 102 via blockchain 104, the software module 114 associated with each entity device 106 may process the real-time data stream 110 to generate two different low volume output data streams 116 of "high value" information. For example, if host device 102 includes a radar receiver, a first entity device 106 associated with a weather forecaster may execute or enter into a smart contract 112 with host device 102 to upload a software module 114 that is configured to process the radar data generated by the radar receiver to find data specifically relevant to detecting or predicting weather patterns. The software module 114 of the weather forecaster would then output and transmit back to the weather forecaster only the data specifically related to weather patterns, i.e., low volume high value data for the weather forecaster. In another example, the same host device 102 including a radar receiver may execute a smart contract with a second entity device 106 associated with an air traffic control system. The air traffic control system may upload a software module 114 that is configured to process the same radar data generated by the radar receiver to find data specifically related to aircraft currently in range of the radar receiver. The software module of the air traffic control system would then output and transmit back to the air traffic control system only the data specifically related to aircraft currently in range of the radar receiver, i.e., low-volume high value data for the air traffic control system.

In some embodiments, multiple smart contracts may be executed for the same host device 102 at the same time. For example, both the weather forecaster and air traffic control system may execute or enter into smart contracts 112 with the same host device 102 at the same time such that both the software module 114 of the weather forecaster uploaded to host device 102 and the software module 114 of the air traffic control system also uploaded to host device 102 may execute on host device 102 at the same time and transmit data back to their respective entities at the same time.

In other embodiments, host device 102 may provide an exclusive smart contract 112 to be executed on a first come, first serve basis where, for example, once a first entity has completed the smart contract 112, the smart contract 112 may then be available for another entity to execute. In some embodiments, host device 102 may also queue access to the data stream 110 such that the software modules 114 of entity devices executing or agreeing to smart contracts 112 with host device 102 may be executed by host device 102 in a sequence and the data stream 110 may be processed in a serial manner. This allows host device 102 to continuously supply a data stream 116 to some entity with as little downtime as possible.

Executing an unknown entities' software module 114 on a host device 102, however, may require host device 102 to take certain precautions to ensure both that the host device remains secure and free from viruses, malware, and other unwanted intrusions and is also capable of or willing to execute the software module 114 as provided. To this end, host device 102 may provide in smart contract 112 specific terms and conditions that must be satisfied to allow an entity device 106 to upload software module 114 to host device 102. For example, in some embodiments, host device 102 may specify hardware and/or software requirements in the smart contract 112 that must be met by software module 114 before upload can take place. In some embodiments, host device 102 may specify a data rate at which software module 114 may utilize host data resources to transmit data back to entity device 106. For example if host device 102 has a 50 Mbit/s connection speed, host device 102 may specify in smart contract 112 that the software module 114 may transmit data back to entity device 106 at no more than 30 Mbit/s to avoid overloading the network connection. In some embodiments, smart contract 112 may include a term requiring the software module 114 to be uploaded from entity device 106 to include a digital signature of a reputable third party that assures the third party verified integrity of the software module 114 to be uploaded. For example, smart contract 112 may include a requirement that software module 114 be verified by International Business Machines Corporation (IBM®) or another reputable third party.

In some embodiments, software module 114 may be created by a manufacturer of host device 102 or sensor 108 and provided to entity device 106. For example, a radar manufacturer may create a software module 114 for processing a raw high-volume data stream from a radar receiver and license or sell such software to a weather forecaster for later upload to a host device in accordance with smart contract 112. In some embodiments the software module 114 may be installed on host device 102 by the manufacturer and access rights to use the software module 114 may be governed by the smart contract 112. For example, a manufacturer of host device 102 may provide host device 102 with a number of different software modules 114 each configured to process the high volume data stream from sensor 108 for a specific purpose, e.g., weather forecasting, air traffic control, etc. In some embodiments, a smart contract 112 for host device 102 may include a term providing an entity device 106 with an option to choose which software module 114 to execute. In some embodiments, host device 102 may provide a separate smart contract 112 on blockchain database 104 for each software module 114 installed on the host device 102 to control an entity's right to access each software module 114 separately.

In some embodiments, an entity device 106 may wish to provide host device 102 with an updated or modified version of software module 114. For example, entity device 106 may initially execute a smart contract 112 with host device 102 through blockchain database 104 and upload a first version of software module 114 to host device 102 for execution. After receiving the processed low volume data stream output from software module 114, entity device 106 may determine that the received data stream is not quite what was expected. Entity device 106 may then create or provide an updated version of software module 114 to host device 102 based on this determination. In some embodiments, the executed smart contract 112 may include a term providing entity device 106 with an option to upload updated versions of software module 114 to host device 102 at any time.

In some embodiments, the executed smart contract 112 may instead be limited specifically to the version of software module 114 that has originally been uploaded to host device 102. In such a case, entity device 106 may be required to execute a second smart contract with host device 102, for example, an update smart contract, specifically to update or modify the version of software module 114 on host device 102. For example, host device 102 may at the time of executing the initial smart contract 114 create one or more additional update smart contracts on blockchain database 104 that are configured only for execution by entity 106. For example, the update smart contract may include a term specifying entity device 106 as the only party that may execute or agree to the update smart contract. In some embodiments, entity device 106 may create an update smart contract on blockchain database 104 including a term for execution by host device 102. Entity device 106 may inform host device 102 that the update smart contract is available for execution, for example, via blockchain database 104, peer-to-peer messaging, or direct communication with host device 102, and host device 102 may then execute the update smart contract to trigger a download of the updated or modified software module 114 from the entity device 106 or from another source specified by entity device 106 in the update smart contract.

In other embodiments, entity device 106 may instead cancel the original smart contract 112 and execute a new smart contract 112 with host device 102 specifically to run the updated version of software module 114 on host device 102.

In some embodiments, entity device 106 may provide the updated version of software module 114 directly to host device 102. In other embodiments, entity device 106 may instead provide the updated version of software module to blockchain database 104 for storage and publication to host device 102. For example, entity device 106 may upload the updated version of software module 114 to the storage 204 of one or more of compute resources 202 of blockchain 104. Entity device 106 may then provide a cryptographic hash of the updated version of software module 114 and a digital signature of the hash to public ledger 206 of blockchain database 104. In some embodiments, host device 102 may periodically poll blockchain database 104 to search the decentralized public ledger 206 for any updates or modifications to a software module 114 associated with a smart contract 112 currently executing on host device 102.

When host device 102 determines that an update or modification is available, host device 102 may retrieve the cryptographic hash of the updated version of software module 114 and the digitally signature of the hash from public ledger 206 of blockchain database 104. Host device 102 may then query the storages 204 of blockchain database 104 to find a storage location of the updated version of software module 114 and to verify that updated version of software module 114 in the storage location matches the cryptographic hash. The signed hash verifies that the updated version of software module 114 came from entity device 106. Host device 102 may then provide decentralized ledger 206 with an update indicating that host device 102 has received the updated version of software module 114 and providing decentralized ledger 206 with information including which version of software module 114 is currently installed and executing on host device 102.

Referring now to FIGS. 3-7, communications between host device 102, blockchain database 104, and entity device 106 will now be described.

Figure 3:
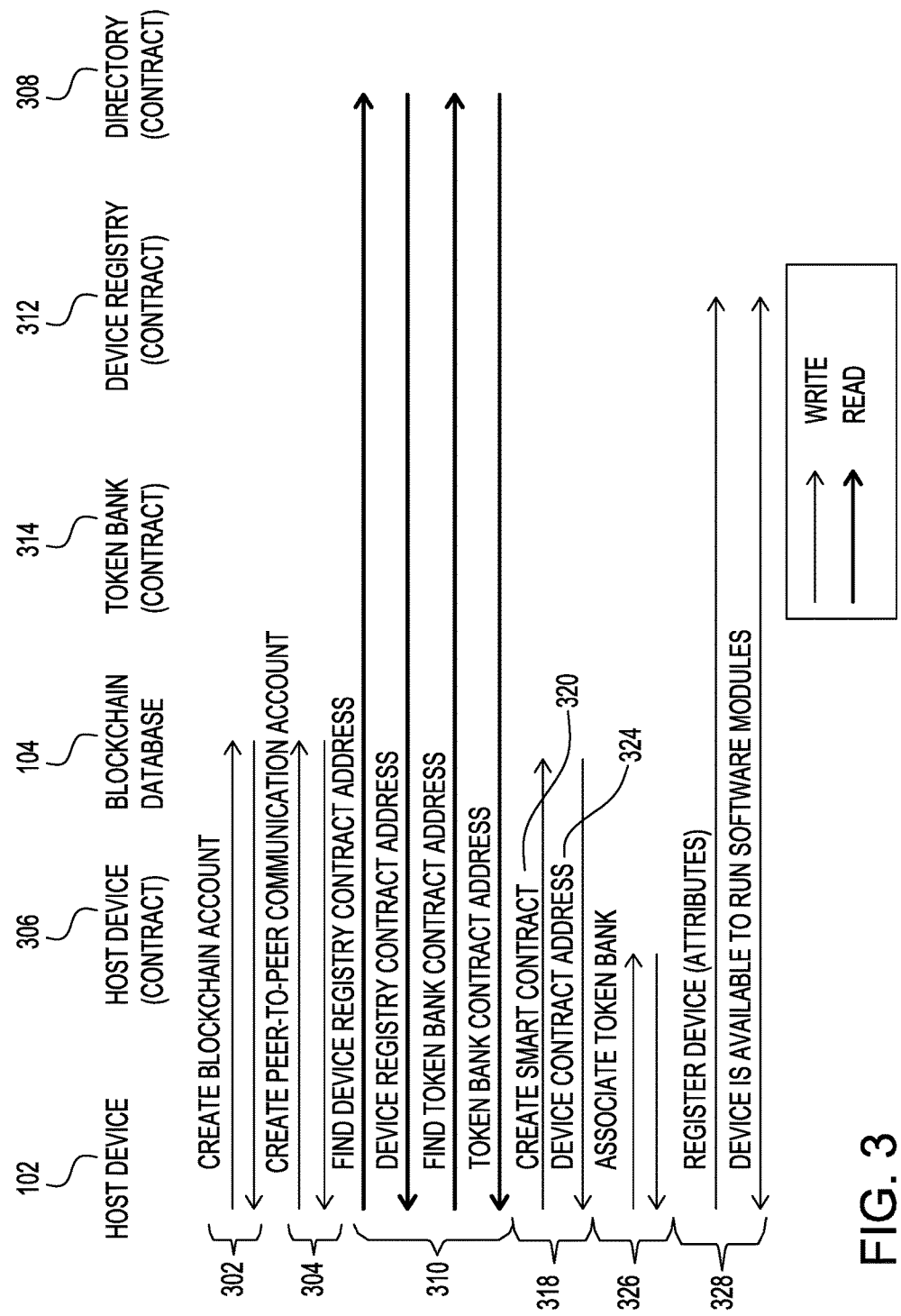
FIG. 3 is an exemplary process flow diagram of the registration of a host device on the blockchain database in the system shown in FIG. 1.

As illustrated in FIG. 3, interactions with blockchain database 104 are performed through communications and the formation and execution of smart contracts. For example, host device 102 may initially join blockchain database 104 by creating a blockchain account at 302 and a peer-to-peer communication account at 304. Host device 102 may now be said to have created a host device contract 306 with the blockchain database 104. The peer-to-peer communication account may be provided through third party peer-to-peer communication services, through blockchain database 104 directly via contract, through a web-based interface, or any other messaging system. In some embodiments, the peer-to-peer communication service may allow for anonymous or pseudo-anonymous communication.

Once the blockchain account and peer-to-peer communication accounts have been registered, host device 102 contacts a directory 308 of blockchain database 104 at 310 to determine contract addresses for a device registry 312 and token bank 314 of blockchain database 104. Directory 308 may be a contract stored on blockchain database 104 that is accessible to all parties associated with blockchain database 104 and may provide entities associated with blockchain database 104 access to contact information for the various features of blockchain database 104 including device registry 312 and token bank 314.

Device registry 312 may be a contract stored on blockchain database 104 that provides a listing of each device that has a smart contract available on blockchain database 104. Device registry 312 may include links to the contract locations on blockchain database 104 of smart contracts for each device and may also include a description of the attributes of each device and the type of data that each device is capable of generating. In some embodiments, device registry may provide additional discovery mechanisms to an entity device 106. For example, device registry 312 may allow an entity device 106 to find a device that is "near" another device. In some embodiments, "nearness" may be measured geographically, based on remoteness from a shared digital resource, or other similar criteria.

Token bank 314 may be a contract stored on blockchain database 104 that manages financial transactions between entities. Token bank 314 may provide escrow services to parties having transactions on blockchain database 104.

At 318, host device 102 may contact blockchain database 104 to create a smart contract 320 associated with a sensor 108 on blockchain database 104 including terms that must be met before an entity device 106 may autonomously execute smart contract 320 to upload and execute software modules 114 on host device 102. Host device 102 may receive a device contract address 324 of host device contract 306 from blockchain database 104 identifying the location of smart contract 320 on the public ledger 206 of blockchain database 104.

At 326, host device 102 may associate the host device contract 306 with token bank 314.

At 328, host device 102 may be registered with device registry 312. During registration, host device 102 may provide device registry 312 with device contract address 324 and various attributes of host device 102 including, for example, the hardware/software specifications of host device 102, the type of data that sensor 108 can gather, any software installed on host device 102 that may be utilized by entity devices 106, or any other attributes that may be relevant an entity device 106 choosing host device 102 for the execution of a device smart contract 320. Device registry 312 may also be provided with the device contract address 324. Once host device 102 has been registered with device registry 312, host device 102 is available to run software modules provided by entity devices 106.

Figure 4:
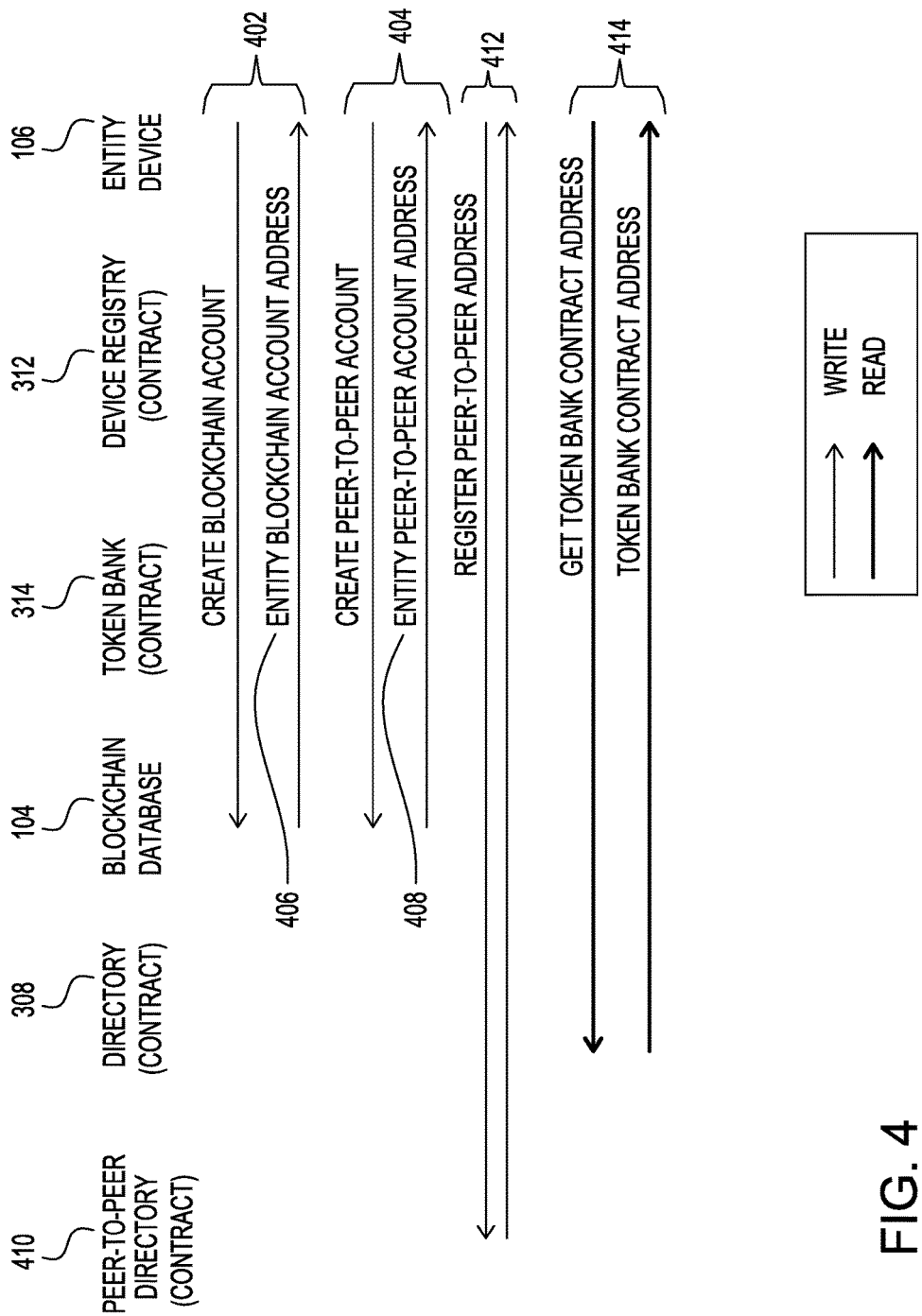
FIG. 4 is an exemplary data flow diagram of the registration of an entity device on the blockchain database in the system shown in FIG. 1.

Referring now to FIG. 4, interaction between an entity device 106 and blockchain database 104 is now described. At 402, entity device 106 may join blockchain database 104 by creating a blockchain account at 402 and a peer-to-peer communication account at 404. Entity device 106 may receive from blockchain database 104 an entity blockchain account address 406 and an entity peer-to-peer account address 408. Entity device 106 may register peer-to-peer account address 408 with a peer-to-peer directory 410 of blockchain database at 412. At 414, entity device may request the token bank contract address from directory 308. Entity device 106 is now prepared to execute smart contracts with host devices.

Figure 5:
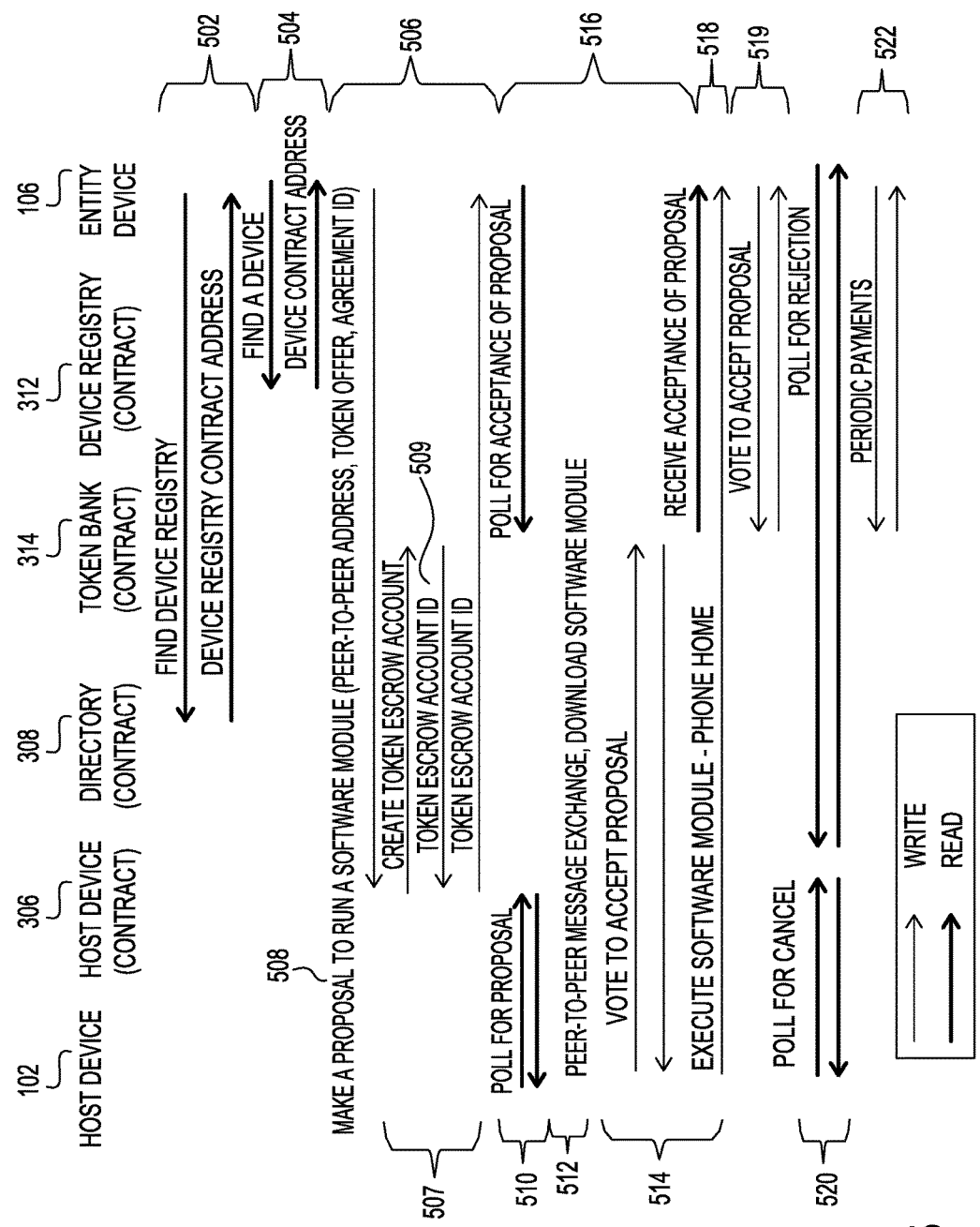
FIG. 5 is an exemplary data flow diagram of the execution of a smart contract via the blockchain database between the host device and entity device of FIG. 1.

FIG. 5 illustrates an entity device 106 fully entering into and executing a smart contract with host device 102 on blockchain database 104. At 502, entity device 106 may request and receive the device registry contract address from directory 308. At 504, entity device may use the device registry contract address to search the device registry 312 and find suitable host device 102. For example, entity device 106 may search the device register 312 to find a host device 102 having a sensor 108 configured to generate the desired type of data stream. Once host device 102 is found on device registry 312, entity device 106 may receive from device registry 312 the contract address 306 for host device 102. At 506, entity device 106 generates and submits a proposal 508 to host device 102 via host device contract 306. Proposal 508 may include, for example, entity device 106's peer-to-peer account address 408, payment type, a number of tokens or amount of payment offered, token bank account information, agreement ID, and any other information that may be relevant to the execution of smart contract 112. In response to proposal 508, host device contract 306 may create an escrow account with token bank 314 and provide a token escrow account ID 509 to entity device at 507.

At 510, host device 102 polls host device contract 306 and determines that proposal 508 has been received.

At 512, host device 102 communicates with entity device 106 via peer-to-peer messaging to download software module 114, as shown, for example, in FIG. 6 described in more detail below. If a third party digital signature of software module 114 is included as a term of smart contract 112, host device 102 may verify that software module 114 has a digital signature. Host device 102 may also confirm that proposal 508 complies with all other the terms of smart contract 114. Once host device 102 confirms that proposal 508 complies with all of the terms of smart contract 114, host device 102 transmits a vote to accept proposal 508 to token bank 314. Host device may also execute software module 114 once the proposal 508 has been accepted by host device 102. Meanwhile, entity device 106 polls for and receives the vote to accept proposal 508 from token bank 314 at 516. Having received the vote to accept proposal 508, entity device 116 now waits for and receives confirmation from software module 114 that software module 114 has been executed and is running at 518. Confirmation that software module 114 has been executed may be received, for example, via blockchain database 104, via peer-to-peer messaging, or directly from host device 102.

Once entity device 106 receives the vote to accept the proposal 508 from token bank 314 confirmation of execution is received from software module 114, entity device 106 transmits a vote to accept proposal 508 to token bank 314 at 519.

At 520, host device 102 polls host device contract 306 for a cancellation while entity device 106 also polls host device contract 306 for a rejection of smart contract 112. In some embodiments, entity device 106 may cancel smart contract 112 if, for example, host device 102 fails to continue transmitting the processed data stream 116. On the other side, in some embodiments, host device 102 may reject smart contract 112 after acceptance, for example, if software module 114 does not perform as expected, e.g., attempts to transmit data stream 116 at a higher rate than specified in the terms of smart contract 112. Once software module 114 has been executed and smart contract 112 has been completed, token bank 314 may release any tokens or other payment held in escrow to host device 102.

In some embodiments, where smart contract 112 is a recurring contract, for example, a month to month contract, entity device 106 may periodically submit payments to token bank 314 for distribution to host device 102 at 522.

Figure 6:
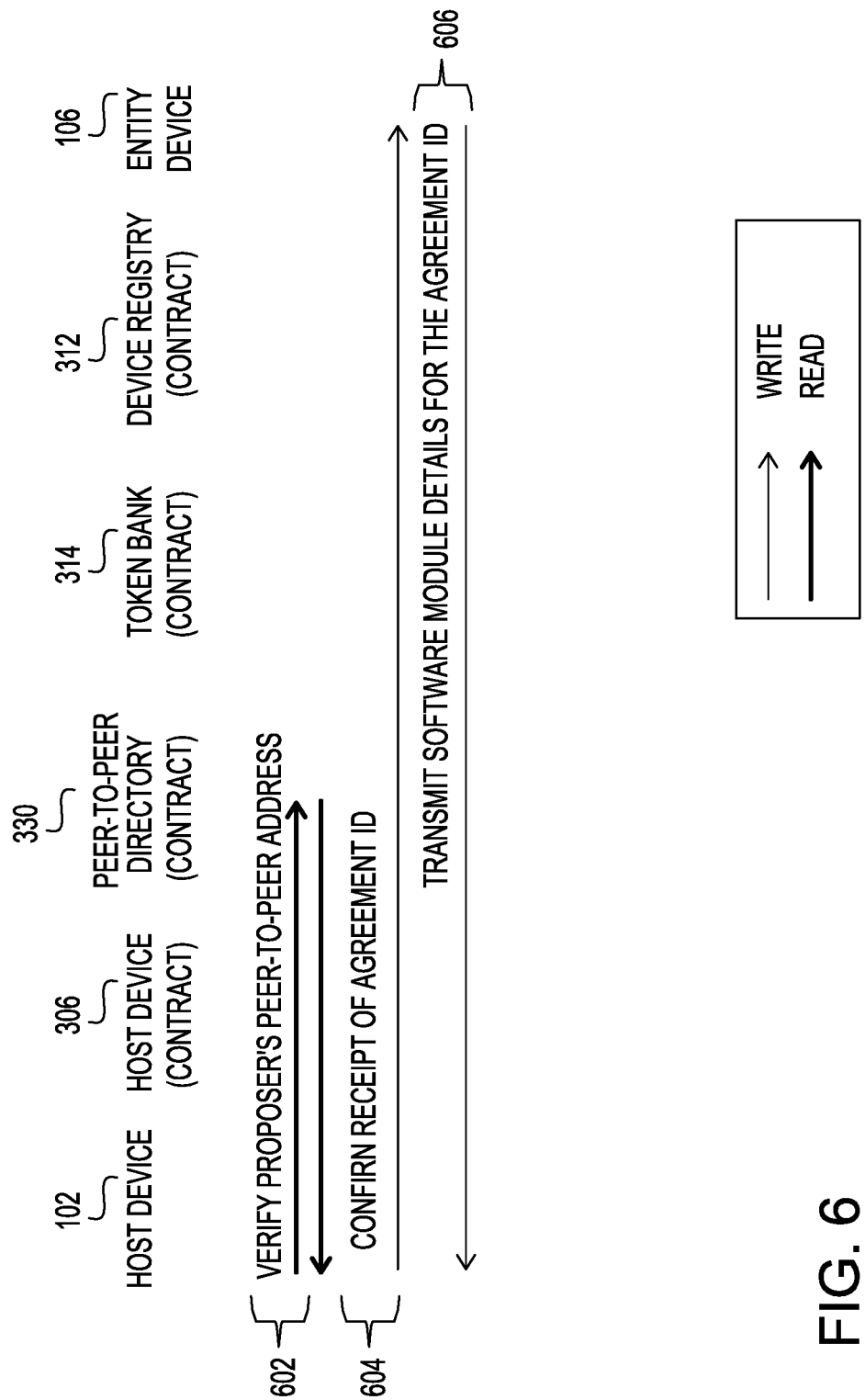
FIG. 6 is an exemplary data flow diagram of the peer-to-peer communication between the host device and entity device during the execution of the smart contract in FIG. 5.

Referring now to FIG. 6, communication between host device 102 and entity device 106 via peer-to-peer message during 512 (FIG. 5) of the proposal process will now be described. At 602, host device consults peer-to-peer directory 330 to verify the peer-to-peer address provided by the proposal 508. At 604, host device confirms receipt of the agreement ID with entity device 106. At 606, entity device 106 transmits to host device details of the software module 114 proposed for execution under the agreement ID.

Figure 7:
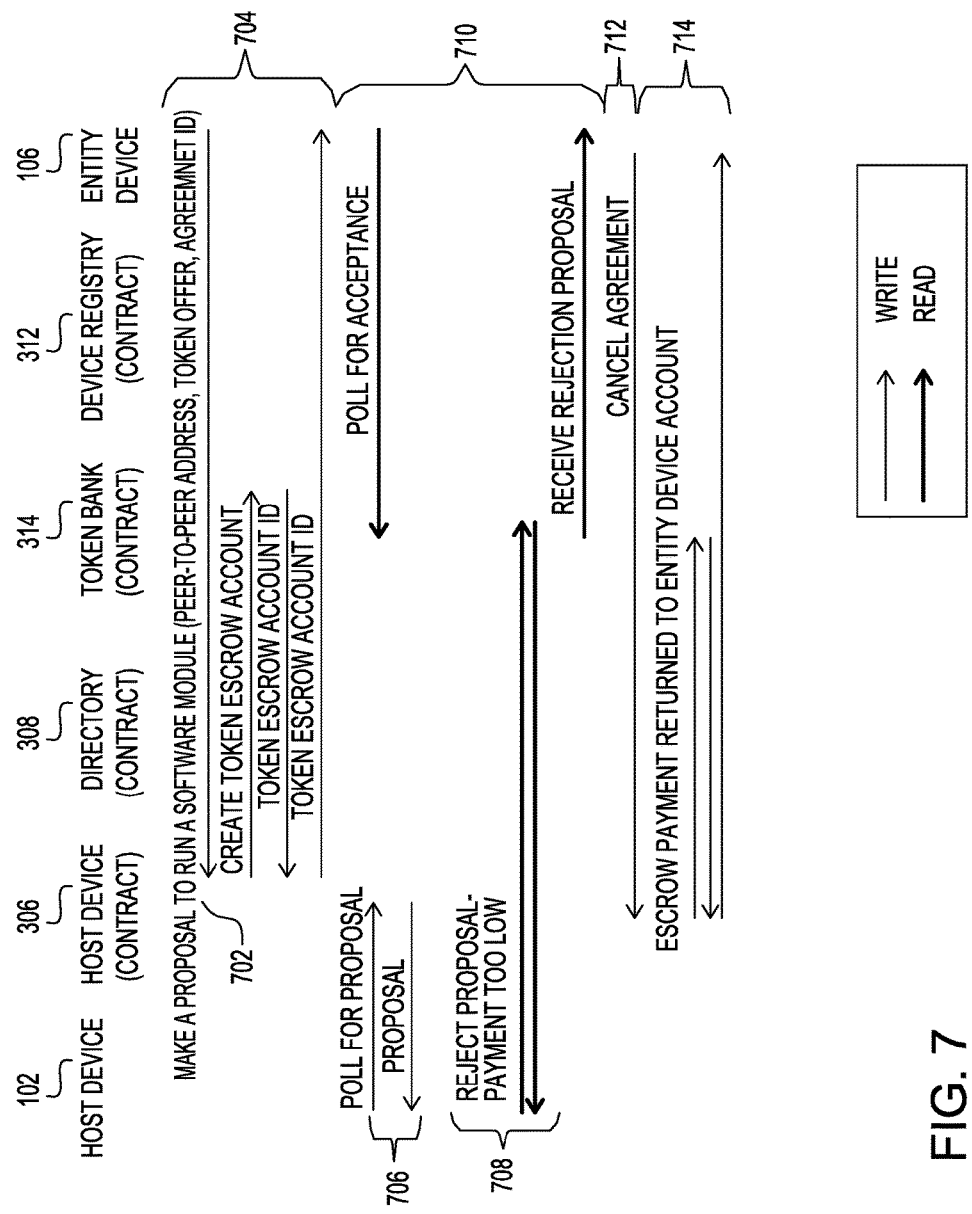
FIG. 7 is an exemplary data flow diagram of the rejection of a proposal based on a smart contract by the host device of FIG. 1.

FIG. 7 illustrates a host device 102 rejecting a proposal provided by an entity device 106. Similar to the process described in FIG. 5, entity device 106 submits a proposal 702 to host device contract 306 and host device contract 306 opens an escrow account with token bank 314 at 704. At 706, host device 102 polls host device contract 306 for receipt of a proposal 702 and receives the proposal 702 from host device contract 306. In this example, host device 102 determines that proposal 702 includes a term that does not satisfy the terms of smart contract 112 provided on host device contract 306 and rejects proposal 702 at 708. For example, host device 102 may determine that the number of tokens or other payment to be paid to host device 102 for access is insufficient. Host device 102 transmits the rejection to token bank 314. At 710, entity device 106 meanwhile polls token bank 314 for a rejection of the proposal 702 and having received the rejection, cancels the agreement at 712. At 714, host device contract 306 removes any tokens or payment for proposal 702 that were placed in escrow from token bank 314 and returns them to entity device 106.

Figure 8:
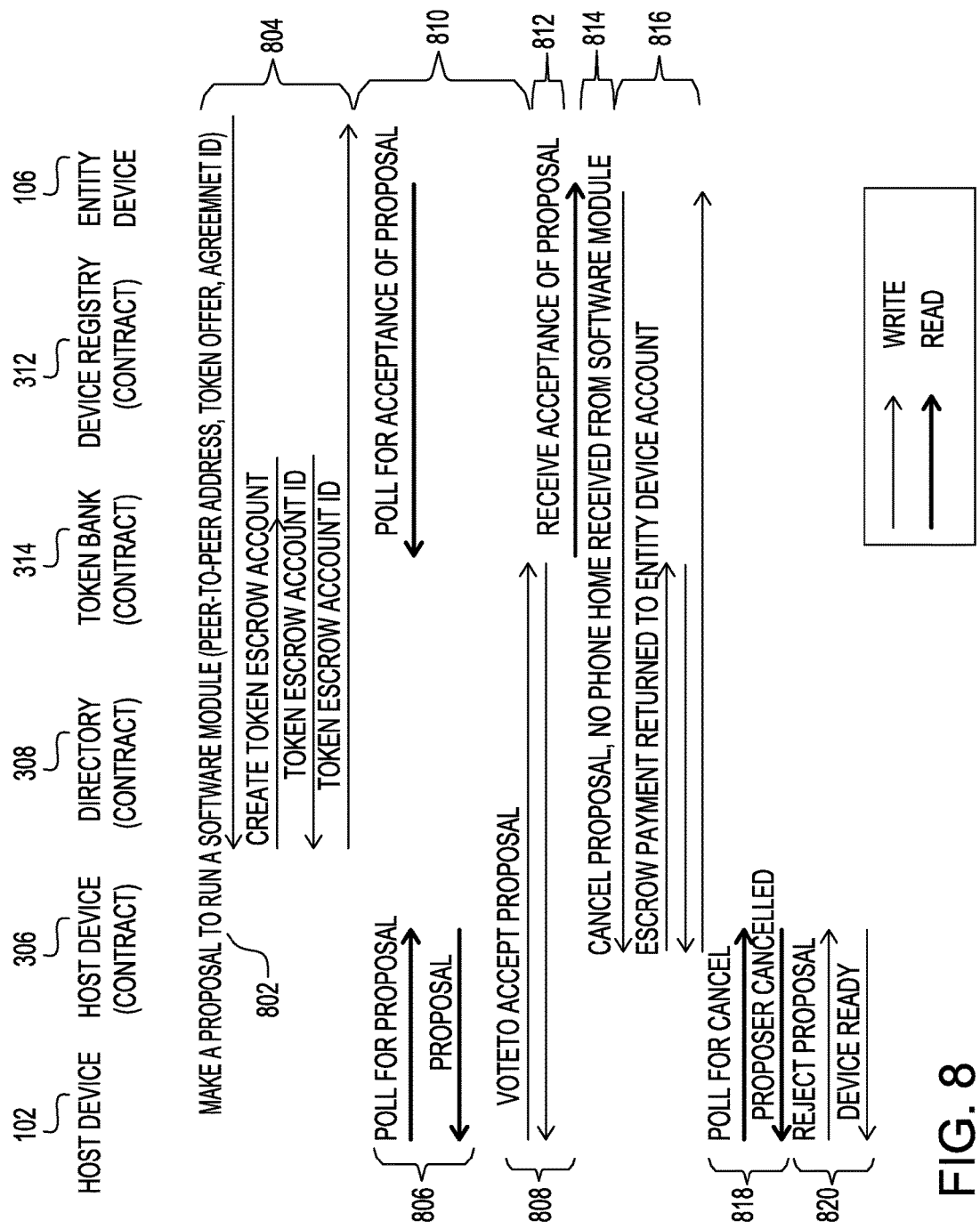
FIG. 8 is an exemplary data flow diagram of the cancellation of a proposal based on a smart contract by the entity device of FIG. 1.

FIG. 8 illustrates an entity device 106 canceling a proposal. Similar to the process described in FIGS. 5 and 7, entity device 106 submits a proposal 802 to host device contract 306 and host device contract 306 opens an escrow account with token bank 314 at 804. At 806, host device 102 polls host device contract 306 for receipt of a proposal 802 and receives the proposal 802 from host device contract 306. At 808, host device 102 transmits a vote to accept the proposal 802 to token bank 314. At 810, entity device 106 meanwhile polls token bank 314 for acceptance of the proposal 802 and receives acceptance of proposal 802 from token bank 314 at 812. At 814, entity device 106 has not received confirmation from software module 114 that software module 114 has been executed by host device 102 and transmits a cancellation of proposal 802 to host device contract 306. For example, entity device 106 may wait a pre-determined period of time after receiving acceptance of proposal 802 before determining that no confirmation has been received. A non-limiting example of a predetermined amount of time may be, for example, five seconds. In some embodiments, the terms of either proposal 802 or smart contract 112 may specify the pre-determined amount of time. At 816, host device contract 306 removes any tokens or other payment for proposal 802 that were placed in escrow from token bank 314 and returns them to entity device 106. At 818, host device 102 polls host device contract 306 for cancelation of proposal 802. Upon receiving cancelation of proposal 802, host device transmits a rejection of proposal 802 to host device contract 306 and is ready to execute proposals on smart contract 114 at 820.

Referring now to FIGS. 9 and 10, a graphical user interface (GUI) 900 is provided to allow a host device 102 to join blockchain database 104. With reference to FIG. 9, when registering a smart contract 112 on blockchain database 104, host device 102 may input specific terms and information for use by blockchain database 104. For example, GUI 900 may provide host device 102 with a field for inputting a base price 902 that is required for a proposal on smart contract 112 to execute. In some non-limiting embodiments, base price 902 may be in the form of digital currency such as, for example, bitcoins™. In some non-limiting embodiments, base price 902 may be in the form of any traded currency including, for example, Dollars (US, Canadian, and/or Australian), British Pound, European Euros, Chinese Yuan, Japanese Yen, or any other currency.

GUI 900 may also provide host device 102 with a field for inputting a maximum bandwidth 904 allowed for smart contract 112. Maximum bandwidth 904 may be, for example, a maximum value available for a month, a day, an hour, a minute, a second, a millisecond, or any other unit of time. For example, maximum bandwidth 904 may be 1020 MB per month, as illustrated in FIG. 9. In some embodiments, maximum bandwidth 904 may be a data transmission rate such as, for example, 30 Kbit/s.

With reference also to FIG. 10, GUI 900 may also provide host device 102 with a field for inputting a location 906 of host device 102. Location 906 may be in the form of, for example, longitude and latitude coordinates, GPS coordinates, country, state, town, address, or any other form of location. In some embodiments, GUI 900 may be configured to determine the location of host device 102 fill in location 906 automatically.

GUI 900 may also provide the host device 102 with the option 908 to permit the seeding of software modules to other users, for example, via a peer-to-peer file sharing program. GUI 900 may also provide the host device 102 with the option 910 to permit entity devices to update software modules without renegotiating smart contract 112 or proposal 702, 802, or 902.

Figure 11:
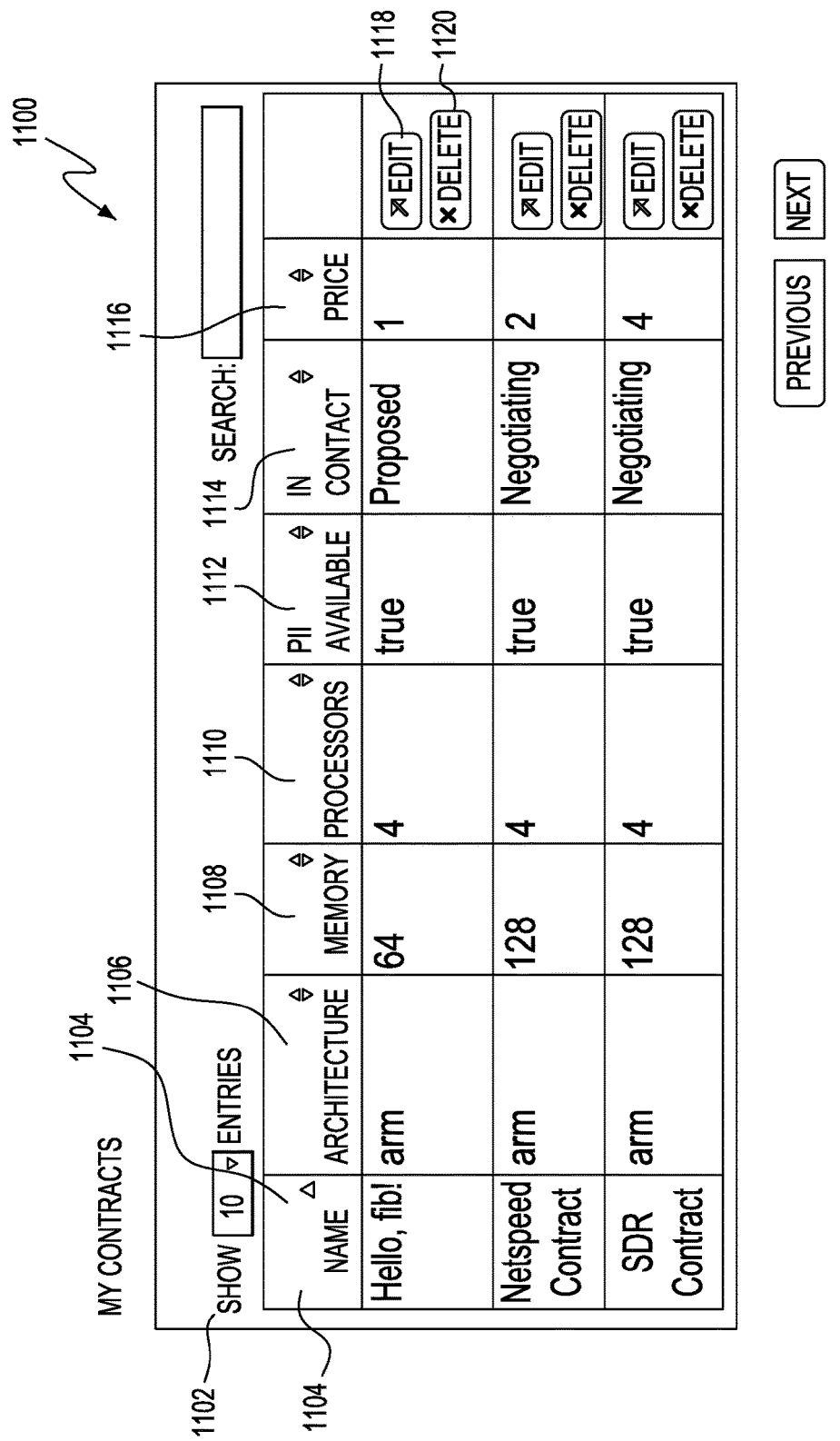
FIG. 11 is an illustration of a graphical user interface for managing the smart contracts of a host device on the blockchain database of FIG. 1.

With reference to FIG. 11, GUI 1100 provides a host device 102 with a management view 1102. Management view 1102 displays each smart contract 112 associated with host device 102 including information such as, for example, a name 1104, architecture of the host device 1106, amount of available memory 1108, number of processors 1110, whether the smart contract is available 1112, the current contract status of the smart contract 1114, the current base price of the smart contract 1116 and the option to edit 1118 or delete 1120 the smart contract. For example, a smart contract 1122 having the name 1104 of "Hello, fib!" is displayed as having received a proposal while another smart contract 1124 having the name "Netspeed contract" is displayed as currently in negotiation, for example, according to the process described in FIG. 5. Host device 102 may edit or delete any of smart contracts 1122, 1124, or 1126 by selecting edit button 1118 or delete button 1120.

In an aspect of the present disclosure, a host device may join a blockchain database managed by one or more devices on a decentralized network. The blockchain database may include one or more smart contracts that specify transactions among entities. The host device may include a sensor configured to generate a real-time high volume data stream. The host device may create on the blockchain database a smart contract specifying terms for providing an entity access to the real-time high volume data stream generated by the sensor. The host device may receive from an entity device a software module in response the created smart contract. The software module may be configured to process the real-time high volume data stream generated by the sensor into a real-time low volume data stream for transmission to the entity device. In response to receiving the software module the host device may execute the software module. Execution of the software module may process the real-time high volume data stream generated by the sensor into a real-time low volume data stream. The host device may transmit to the entity device the real-time low volume data stream generated by the software module. The host device may receive from the entity device a proposal to access the data stream generated by the sensor according to the terms of a created smart contract. The proposal may specify the software module to be uploaded to and executed on at least a portion of the host device. In response to receipt of the proposal the host device may transmit to the entity device acceptance of the proposal. The host device may be configured to autonomously accept the proposal if the proposal meets the terms of the created smart contract. The blockchain database may include a device registry. The host device may publish on the device registry of the blockchain database registry information of the host device. The published registry information may include a link to the smart contract created by the host device. The registry information may include attributes of the host device. The attributes may include an identification of a kind of data stream that the sensor of the host device is capable of producing. The terms of the created smart contract may include a term specifying a maximum transmission rate for the real-time low volume data stream generated by the software module. The terms of the created smart contract may include a term specifying that any software module to be executed under the created smart contract must be verified by a reputable third party. The software module may be created at least in part by a manufacturer of the host device. The real-time low volume data stream generated by the software module may be transmitted to the entity device via a peer-to-peer file sharing program. The host device may receive a confirmation of payment from the blockchain database in response to the transmission of the real-time low volume data stream generated by the software module to the entity device.

In an aspect of the present disclosure, an entity device may query a blockchain database managed by one or more devices on a decentralized network to identify a host device including a sensor configured to generate a real-time high volume data stream. The entity device may receive in response to the query a link to a smart contract associated with the host device. The smart contract may be stored on the blockchain database and may specify terms for providing an entity access to the real-time high volume data stream generated by the sensor. The entity device may submit to the host device a proposal to access the real-time high volume data stream generated by the sensor according to the terms of the smart contract. The proposal may specify a software module to be uploaded to and executed on at least a portion of the host device. The software module may be configured to process the real-time high volume data stream generated by the sensor into a real-time low volume data stream for transmission to the entity device. The entity device may receive an acceptance of the proposal. In response to receiving an acceptance of the proposal the entity device may transmit to the host device the software module. The entity device may receive the real-time low volume data stream generated by the software module from the host device. The blockchain database may include attributes of the host device. The attributes may include an identification of a kind of data stream that the sensor of the host device is capable of generating. The kind of data stream may be specified as part of the query by the entity device. The terms of the smart contract may include a term specifying a maximum transmission rate for the real-time low volume data stream generated by the software module. The terms of the smart contract may include a term specifying that any software module to be executed under the smart contract must be verified by a reputable third party. The entity device may transmit the software module to a reputable third party for verification and may receive from the reputable third party verification information indicating that the software module has been verified by the reputable third party. The proposal may include the verification information received from the reputable third party. The software module may be created at least in part by a manufacturer of the host device. The real-time low volume data stream generated by the software module may be received from the host device via a peer-to-peer file sharing program. The entity device may transfer a payment according to the terms of the smart contract to an escrow account stored on the blockchain database in response to receiving an indication that the software module has been executed by the host device from the host device.

FIG. 12 illustrates a schematic of an example computer or processing system that may implement any of the systems, methods, and computer program products described herein in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 12 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a software module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method comprising:
    joining, by a host device, a blockchain managed by one or more devices on a decentralized network, the blockchain including one or more smart contracts that specify transactions among entities, the host device including a sensor configured to generate a real-time high volume data stream;
    creating on the blockchain, by the host device, a smart contract specifying terms for providing an entity access to the real-time high volume data stream generated by the sensor;
    receiving, by the host device, from an entity device, a software module in response the created smart contract, the software module configured to process the real-time high volume data stream generated by the sensor into a real-time low volume data stream for transmission to the entity device;
    in response to receiving the software module, executing, by the host device, the software module, execution of the software module processing the real-time high volume data stream generated by the sensor into a real-time low volume data stream; and
    transmitting, to the entity device, by the host device, the real-time low volume data stream generated by the software module.

2. The method of claim 1, further comprising:
    receiving, by the host device from the entity device, a proposal to access the data stream generated by the sensor according to the terms of the created smart contract, the proposal specifying the software module to be uploaded to and executed on at least a portion of the host device; and
    in response to receipt of the proposal, transmitting, by the host device, to the entity device, acceptance of the proposal.

3. The method of claim 2, wherein the host device is configured to autonomously accept the proposal if the proposal meets the terms of the created smart contract.

4. The method of claim 1, wherein the blockchain includes a device registry, the method further comprising:
    publishing on the device registry of the blockchain, by the host device, registry information of the host device, the published registry information including a link to the smart contract created by the host device.

5. The method of claim 4, wherein the registry information includes attributes of the host device, the attributes including an identification of a kind of data stream that the sensor of the host device is capable of producing.

6. The method of claim 1, wherein the terms of the created smart contract include a term specifying a maximum transmission rate for the real-time low volume data stream generated by the software module.

7. The method of claim 1, wherein the terms of the created smart contract include a term specifying that any software module to be executed under the created smart contract must be verified by a reputable third party.

8. The method of claim 1, wherein the software module is created at least in part by a manufacturer of the host device.

9. The method of claim 1, wherein the real-time low volume data stream generated by the software module is transmitted to the entity device via a peer-to-peer file sharing program.

10. The method of claim 1, further comprising receiving, by the host device, a confirmation of payment from the blockchain in response to the transmission of the real-time low volume data stream generated by the software module to the entity device.

11. A method comprising:
    querying, by an entity device, a blockchain managed by one or more devices on a decentralized network to identify a host device including a sensor configured to generate a real-time high volume data stream;
    receiving in response to the query, by the entity device, a link to a smart contract associated with the host device, the smart contract stored on the blockchain and specifying terms for providing an entity access to the real-time high volume data stream generated by the sensor;
    submitting, by the entity device, to the host device, a proposal to access the real-time high volume data stream generated by the sensor according to the terms of the smart contract, the proposal specifying a software module to be uploaded to and executed on at least a portion of the host device, the software module configured to process the real-time high volume data stream generated by the sensor into a real-time low volume data stream for transmission to the entity device;
    receiving, by the entity device, an acceptance of the proposal;
    in response to receiving an acceptance of the proposal, transmitting, by the entity device, to the host device the software module;
    receiving, by the entity device, the real-time low volume data stream generated by the software module from the host device.

12. The method of claim 1, wherein the blockchain includes attributes of the host device, the attributes including an identification of a kind of data stream that the sensor of the host device is capable of generating, wherein a kind of data stream is specified as part of the query by the entity device.

13. The method of claim 11, wherein the terms of the smart contract include a term specifying a maximum transmission rate for the real-time low volume data stream generated by the software module.

14. The method of claim 11, wherein the terms of the smart contract include a term specifying that any software module to be executed under the smart contract must be verified by a reputable third party.

15. The method of claim 14, further comprising:
    transmitting the software module to a reputable third party for verification; and
    receiving from the reputable third party verification information indicating that the software module has been verified by the reputable third party, wherein the proposal includes the verification information received from the reputable third party.

16. The method of claim 11, wherein the software module is created at least in part by a manufacturer of the host device.

17. The method of claim 1, wherein the real-time low volume data stream generated by the software module is received from the host device via a peer-to-peer file sharing program.

18. The method of claim 1, further comprising transferring, by the entity device, a payment according to the terms of the smart contract to an escrow account stored on the blockchain in response to receiving an indication that the software module has been executed by the host device from the host device.

19. An apparatus comprising:
at least one processor;
a sensor communicatively coupled to the at least one processor, the sensor configured to generate a real-time high volume data stream;
memory communicatively coupled to the at least one processor, the memory storing instructions that, when executed by the at least one processor, configure the apparatus to:
join a blockchain managed by one or more devices on a decentralized network, the blockchain including one or more smart contracts that specify transactions among entities,
create on the blockchain a smart contract specifying terms for providing an entity access to the real-time high volume data stream generated by the sensor;
receive from an entity device, a software module in response the created smart contract, the software module configured to process the real-time high volume data stream generated by the sensor into a real-time low volume data stream for transmission to the entity device;
in response to receiving the software module, execute the software module, execution of the software module processing the real-time high volume data stream generated by the sensor into a real-time low volume data stream; and
transmit, to the entity device, the real-time low volume data stream generated by the software module.

20. An apparatus comprising:
at least one processor;
memory communicatively coupled to the at least one processor, the memory storing instructions that, when executed by the at least one processor, configure the apparatus to:
query a blockchain managed by one or more devices on a decentralized network to identify a host device including a sensor configured to generate a real-time high volume data stream;
receive in response to the query a link to a smart contract associated with the host device, the smart contract stored on the blockchain and specifying terms for providing an entity access to the real-time high volume data stream generated by the sensor;
submit to the host device a proposal to access the real-time high volume data stream generated by the sensor according to the terms of the smart contract, the proposal specifying a software module to be uploaded to and executed on at least a portion of the host device, the software module configured to process the real-time high volume data stream generated by the sensor into a real-time low volume data stream for transmission to the entity device;
receive an acceptance of the proposal;
in response to receiving an acceptance of the proposal, transmit to the host device the software module; and
receive the real-time low volume data stream generated by the software module from the host device.

* * * * *